United States Patent
Efraty (10) Patent No.: US 7,628,921 B2
(45) Date of Patent: Dec. 8, 2009

(54) APPARATUS FOR CONTINUOUS CLOSED CIRCUIT DESALINATION UNDER VARIABLE PRESSURE WITH A SINGLE CONTAINER

(76) Inventor: Avi Efraty, 4 Mevo Hashaked Street, Har Adar 90836 (IL)

(*) Notice: Subject to any disclaimer, the term of this patent is extended or adjusted under 35 U.S.C. 154(b) by 897 days.

(21) Appl. No.: 10/568,907

(22) PCT Filed: Aug. 16, 2004

(86) PCT No.: PCT/IL2004/000748

§ 371 (c)(1),
(2), (4) Date: Feb. 17, 2006

(87) PCT Pub. No.: WO2005/016830

PCT Pub. Date: Feb. 24, 2005

(65) Prior Publication Data

US 2006/0254981 A1 Nov. 16, 2006

(30) Foreign Application Priority Data

Aug. 17, 2003 (IL) .................................. 157430

(51) Int. Cl.
C02F 1/44 (2006.01)
(52) U.S. Cl. ................... 210/652; 210/195.2; 210/806; 210/321.89; 210/321.65; 210/739; 210/137
(58) Field of Classification Search ................. 210/652, 210/195.2, 806, 253, 257.1, 321.89, 321.65, 210/87, 637, 739, 137
See application file for complete search history.

(56) References Cited

U.S. PATENT DOCUMENTS 4,814,086 A   3/1989   Bratt
4,983,301 A   1/1991   Szucz et al.

FOREIGN PATENT DOCUMENTS

| DE | 2622461 A | * 11/1977 |
| JP | 54128985 A | * 10/1979 |
| WO | WO 03/013704 A2 | 2/2003 |

* cited by examiner

Primary Examiner—Terry K Cecil
(74) Attorney, Agent, or Firm—Daniel B. Schein, Esq.

(57) ABSTRACT

An apparatus for consecutive sequential closed-circuit desalination of a salt water solution by reverse osmosis having at least one circuit and a single container (CN), wherein the circuit includes at least one RO module (M1) connected in parallel.

20 Claims, 3 Drawing Sheets

APPARATUS FOR CONTINUOUS CLOSED CIRCUIT DESALINATION UNDER VARIABLE PRESSURE WITH A SINGLE CONTAINER

BACKGROUND OF THE INVENTION

The present invention relates to a method and apparatus for the desalination of Sea Water (SW) or Brackish Water (BW) by Reverse Osmosis (SWRO or BWRO) in closed circuit.

Desalination by reverse osmosis (RO) occurs when salt water solution is compressed against semi-permeable membranes at pressure higher than its osmotic pressure. The "Plug Flow Desalination" (henceforth "PFD") method involves the passing of pressurized feed flow through pressure vessels (modules) with semi-permeable membrane elements, wherein it separates continuously into non-pressurized flow of desalted permeate and pressurized flow of brine effluent. The SWRO or BWRO recovery of PFD relates to the feed concentration, the applied pressure, the number of elements per module, the staging of modules and the specifications of elements. Pressurized feed flow in PFD is always greater than the permeate flow and 50% recovery implies that pressurized feed flow is twice that of permeate. PFD may also involve partial recycling to enhance recovery and this method is characterized by the continuous flow of its three components; the pressurized feed, the pressurized brine effluent and the permeate.

In contrast with PFD, Closed Circuit Desalination (henceforth "CCD") is a batch process performed with solution recycling under hydrostatic pressure with same rate of pressurized feed supply and permeate delivery. Internal flow in CCD is created by circulation means in order to minimize concentration polarization effects. The CCD technology was first reported in the late eighties by Szucz et al. in U.S. Pat. No. 4,983,301 and by Bratt in U.S. Pat. No. 4,814,086 and the making of such a such batch process continuous was proposed by means of " . . . two relatively large capacity tanks . . . " that are alternately engaged in the closed circuit, thereby, allow the recharge of the closed circuit with fresh feed without the stopping desalination. Earlier patents from the late seventies, such as DE 26 22 461 A (1977) and JP 54 128985 A (1979), describe PFD with partial re-circulation that is fundamentally different from CCD in spite of the similarity of certain fixtures (e.g. circuit with membrane module(s), lines for feed and for recycling, circulation means, pressurizing means, means for effluent discharge, monitoring means, etc.). The distinction between CCD and PLD is clear and unmistakable, since only the former process involves the replacement of brine effluent with fresh feed at atmospheric pressure, thereby avoiding the need for energy recovery from the pressurized brine effluent that is essential in the latter process.

Specification, page 2, line 26, "consecutive" has been replaced "consecutive".

In comparison with PLD, the CCD requires much smaller means for pressurization fresh feed and proceeds with lower specific energy without need of energy recovery. The CCD technology according to said patents is a batch process made to operate continuously by means of consecutive sequential steps involving two relatively large capacity containers and this approach has not been considered economically favored for the design of desalination plants.

The present invention describes both apparatus and methods whereby Closed Circuit Desalination (CCD) may be performed continuously by means of a relatively small single container, thereby, the making of this technology economical feasible for diverse applications involving both sea water and/or brackish water desalination.

SUMMARY OF THE INVENTION

The present invention proposes an apparatus and methods for desalination of sea water, or brackish water, on the basis of reverse osmosis using a closed circuit, wherein feed is recycled through parallel desalination modules by a circulation driving means and counter pressure is created by a pressurizing means which also replaces the released permeate by fresh feed supply. The volume of feed pressurized into the closed circuit during the desalination sequence is monitored by means of a flow meter, this volume at any given instance being equal to the volume of released permeate. The circulation driving means is made to operate at low inlet-outlet pressure difference under elements specifications of maximum element recovery and flow ratio of concentrate to permeate, and the pressurizing means may be made to deliver variable pressure as function of the recovery as monitored by the flow of permeate and/or the flow of pressurized feed and/or the changing concentrations during course of the desalination sequence. Counter pressure of desalination at module inlets is maintained at a fixed level above osmotic pressure during the entire desalination sequence.

The variable pressure closed circuit desalination apparatus may be made to operate continuously by adding a single container which is actuated intermittently to recharge the closed-circuit with fresh feed and at the same time remove the consumed brine effluent from the system. While the pressurized container with fresh feed is engaged with the closed circuit, the desalination process is continued and the modules may be operated non-stop at their specified permeate output.

The inventive method and apparatus of variable pressure closed circuit desalination by reverse osmosis may be implemented by a simple apparatus made of readily available commercial components and it allows low cost desalination at highly significant savings in components including power components and energy.

The inventive apparatus may be operated at constant pressure such that the costs of the pressurizing means are considerably reduced while the energy expenditure is still kept lower than in the methods of the prior art.

BRIEF DESCRIPTION OF THE DRAWINGS

FIG. IA Is a schematic drawing of an apparatus with six modules, each of three elements, and a single container for continuous Closed Circuit Desalination of sea water, or brackish water, describing the valves positions during the closed-circuit desalination while the container is being recharged with fresh sea water feed, in accordance with a preferred embodiment of the present invention.

FIG. IB Is a schematic drawing of an apparatus with six modules, each of three elements, and a single container for continuous Closed Circuit Desalination of sea water, or brackish water, describing the valves positions during the closed-circuit desalination and the pressurization of the container which has been recharged with fresh sea water feed, in accordance with a preferred embodiment of the present invention.

FIG. IC Is a schematic drawing of an apparatus with six modules, each of three elements, and a single container for continuous Closed Circuit Desalination of sea water, or brackish water, describing the valves positions during the recharge of the closed-circuit with fresh feed and the simultaneous removal of the brine effluent through the container, in accordance with a preferred embodiment of the present invention.

DETAILED DESCRIPTION OF THE INVENTION

Figure 1A:
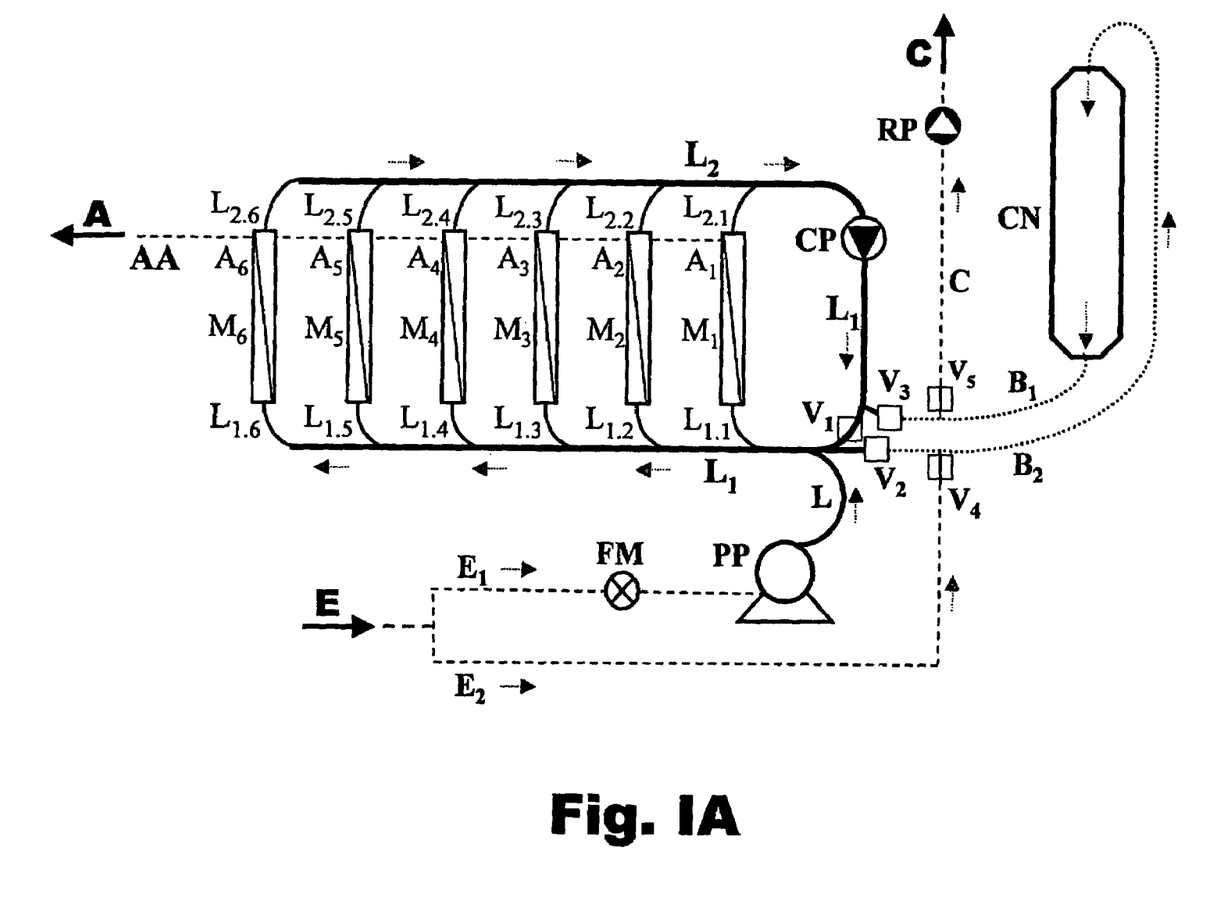
Figure 1B:
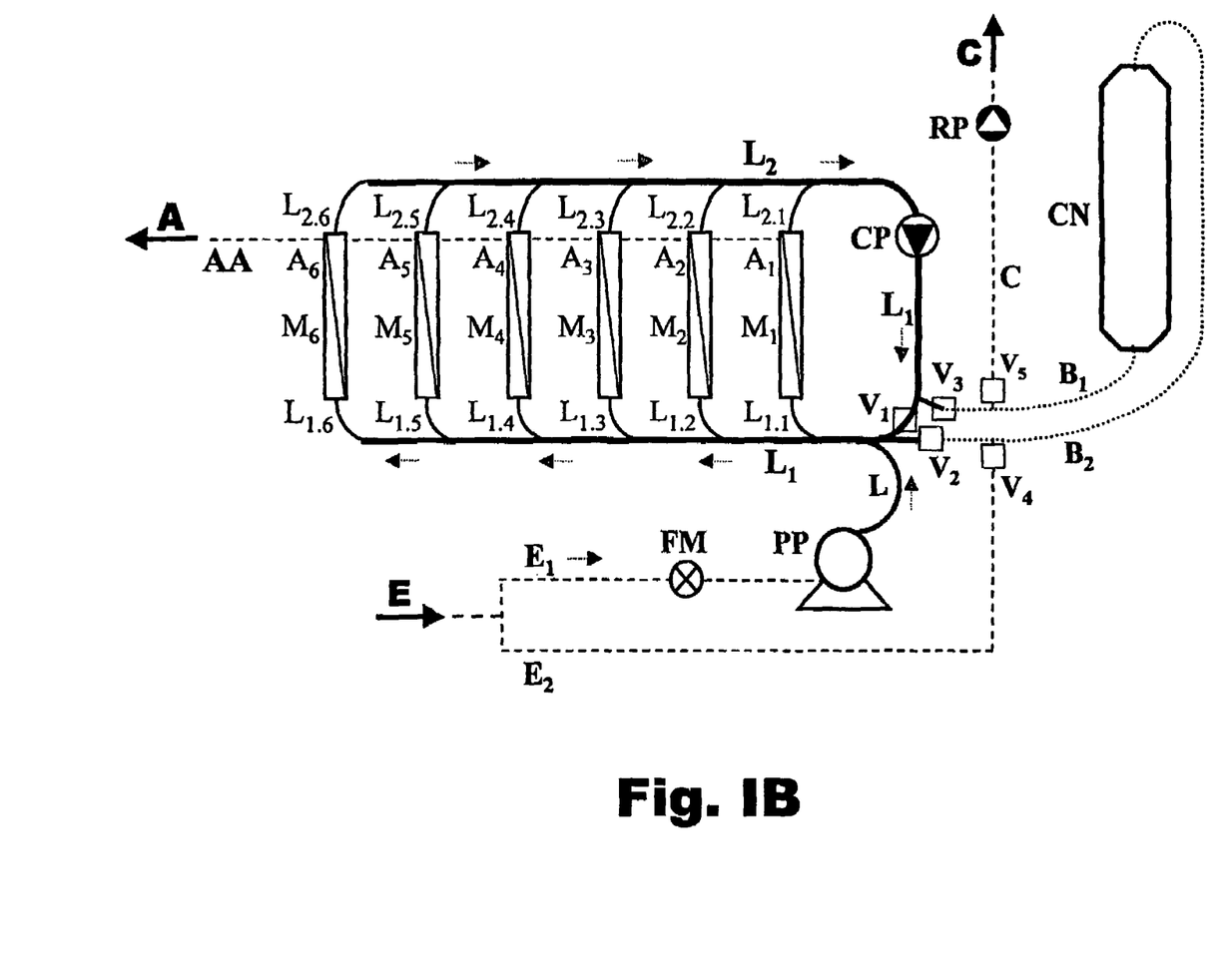
Figure 1C:
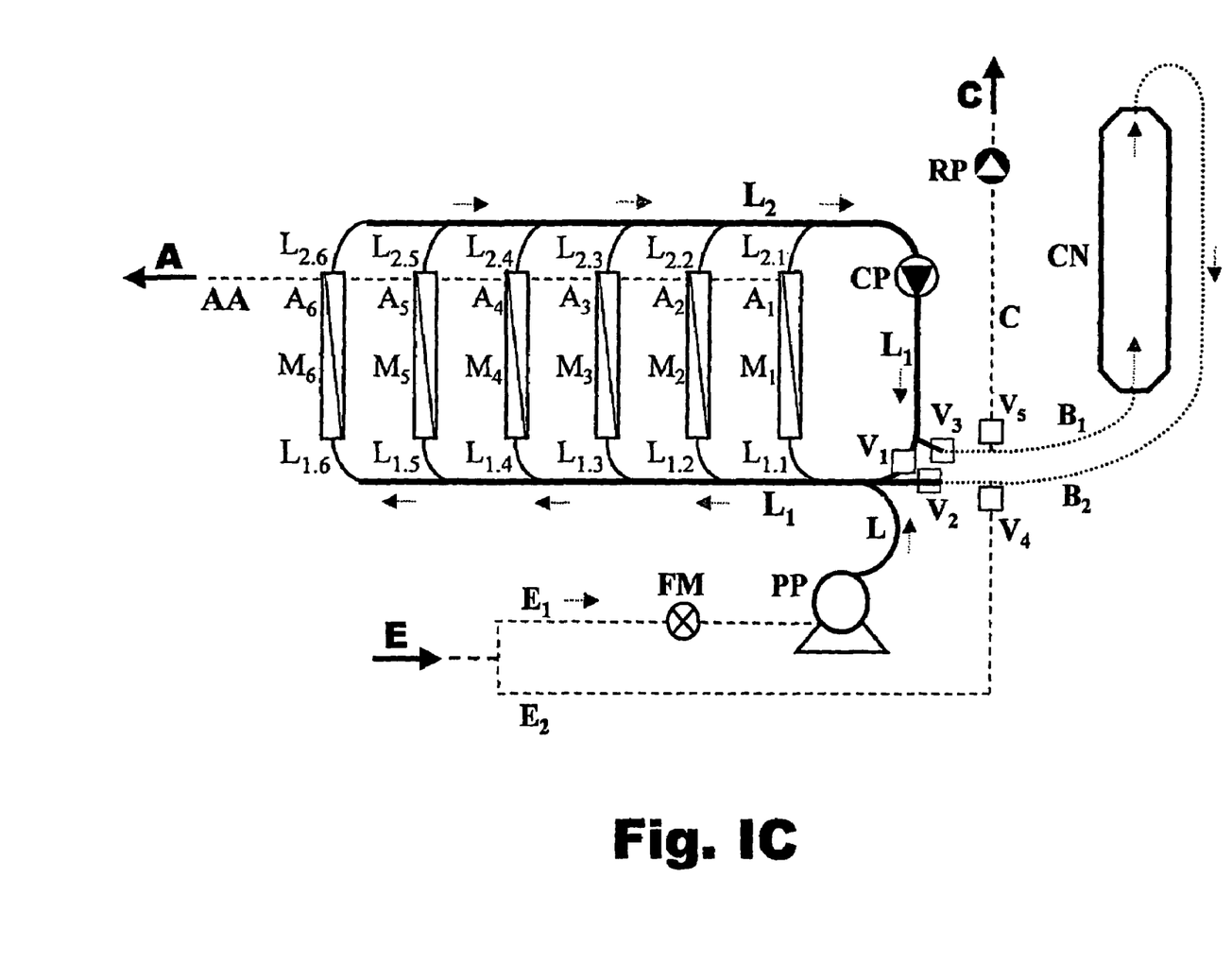

The present invention provides a solution to the problem of extensive energy consumption and high costs involved in reverse osmosis desalination processes of the prior art by proposing an apparatus and method for consecutive sequential desalination of sea water, or brackish water, by reverse osmosis comprised of a closed-circuit, wherein feed is recycled through parallel desalination modules by a circulation pump, a single container is used intermittently to recharge the closed-circuit with fresh feed and remove the brine effluent, and counter pressure is created by a pressurizing pump which also replaces the released permeate by fresh feed supply.

In accordance with the inventive method, the volume of the feed pressurized into the closed circuit during the desalination sequence is monitored by means of a flow meter, this volume at any given instance being equal to the volume of released permeate. The volume of released permeate being directly proportional to the raise in osmotic pressure, the monitoring of this volume provides the means to control the counter pressure of desalination at modules' inlets such that it is kept at a fixed level above osmotic pressure throughout the desalination sequence.

In accordance with the novel apparatus and method of the invention, modules may comprise one, two, three or more membrane elements each and this number dictates the module recovery per single recycling pass, whereas, the ultimate recovery of the entire sequential process depends only on the total number of recycling passes performed in the closed-circuit under variable pressure conditions of fixed net driving pressure. In sharp contrast, single pass desalination of sea water by the CFD method of the prior art requires modules of seven or eight elements and the overall recovery remains low (40%-42%) if the maximum element recovery specified by the manufacturers' of membrane elements under test conditions (e.g. 10%) is not exceeded. In simple terms, the novel invention allows the reaching of any desired desalination recovery without exceeding the specified maximum element recovery under test conditions, whereas, the recovery limits of the CFD method of prior art under such conditions are in the range of 40%-42%.

The inventive method allow the attainment of high average recovery per element without exceeding the specifications of maximum element recovery under test conditions and this is not possible by the CFD method of prior art.

The recovery of modules with 1, 2, 3, 4, 5, 6, 7 and 8 elements with specified maximum element recovery of 10% under test conditions is 10.0(10) %, 18.1(9.05) %, 24.5(8.1) %, 29.7(7.4) %, 33.9(6.8) %, 37.3(6.2) %, 40.0(5.7) %, 42.1 (5.3) %, respectively, with average recovery value per element given in parenthesis. The much higher average element recovery expected by the inventive method as compared with the CFD method of prior art implies significant savings of membrane elements by the new method.

The average flow per element under the specified test conditions of the manufacturers is directly related to the average recovery per element, and therefore, higher element recovery also implies faster permeate flow. Salt passage of semi-permeable membrane element is inversely related to the average element flow, and therefore, the inventive method is expected to afford permeates of lower salt content and higher quality as compared with the CFD method of prior art. In light of the aforementioned, the salt passage by the inventive method is expected to decrease as function of decreased number of elements per module. Accordingly, the better quality permeates by the inventive method are received with modules of fewer elements.

It is another advantage of the invention that by gradually increasing the counter pressure of desalination such that it is kept at a fixed value above the osmotic pressure of concentrate at modules' inlets, the mean counter pressure of the entire process is significantly lower than the constant counter pressure required by the CFD method of the prior art, and this implies significant savings in power and energy by the inventive method.

In accordance with another advantage of the invention, the flow in the closed circuit created by the circulation means can be controlled and adjusted to minimize the concentration polarization effect by disturbing the concentrate thin layer on the membrane surfaces.

The inventive method circumvents completely the need for expensive energy recovery means which are the most tedious and troublesome components in CFD apparatus of the prior art.

The novel apparatus and method of the invention eliminate the need for the application of vast over-power as well as the need for excess power recovery practice characteristic of the existing CFD methods.

In accordance with another advantage of the invention, the footprint of desalination units is sharply reduced in comparison with existing CFD methods due to the significant savings in power components, membrane elements and energy as well as by eliminating completely the need for energy recovery from the brine effluent.

FIG. IA is a schematic drawing of an apparatus that is one of the preferred embodiments of the inventive apparatus. As seen in FIG. IA, the inventive desalination apparatus comprises a pressurized sea water circuit which feeds in parallel a plurality of desalination modules $M_1$-$M_6$ with said circuit and modules constitute a Closed-Circuit (henceforth "CC") wherein desalination takes place. It will be understood that the number of modules is not limited to the six modules shown in FIG. IA and it may be smaller or larger according to different design requirements. It is one of the advantages of the inventive apparatus that it may be operated with the commercial modules known from the prior art. It is also envisaged that different kinds of modules may be designed to be applied in the inventive apparatus, or the apparatus may be provided with commercial modules not known at the time of this invention. The modules to be applied in the inventive apparatus will generally comprise one or more elements within housing. The concentrate from modules outlets is recycled back to the modules inlets through the CC by means of a circulation pump CP that is operated at low inlet-outlet pressure difference. The desired hydrostatic pressure in the CC, including the modules $M_1$-$M_6$, is created by means of a pressurizing pump PP that feeds sea water into the apparatus through line L replacing the volume of released permeate, designated by an arrow A, by fresh sea water supply designated by arrow $E_1$. The volume of the sea water supply is being monitored continuously by means of a flow meter FM. The pressurizing pump PP is made to actuate either at constant pressure or at progressively increased pressure as function of desalination recovery manifested by monitored volume on the flow meter FM. The apparatus also comprises lines $L_1$ for conducting supply in the CC from the circulation pump CP to the inlets of modules $M_1$-$M_6$ via secondary lines $L_{1.1}$, $L_{1.2}$, $L_{1.3}$, $L_{1.4}$, $L_{1.5}$, $L_{1.6}$. The apparatus further comprises line $L_2$ for the recycling of partially desalinated sea water from the modules outlets via secondary collecting lines $L_{2.1}$, $L_{2.2}$, $L_{2.3}$, $L_{2.4}$, $L_{2.5}$, $L_{2.6}$ driven by circulation pump CP. The entire CC comprises of lines $L_1$, $L_2$ and the modules $M_1$-$M_6$ with their inlets and outlets secondary lines. It will be understood that the design of the desalination circuit and lines as shown in FIG. IA is schematic and simplified and is not to be regarded as limiting the invention. In practice the desalination apparatus may comprise many additional lines, branches, valves and other installations or devices as necessary according to specific requirements while still remaining within the scope of the invention and the claims.

Referring again to FIG. IA, the desalination apparatus further comprises a line AA for the collection of released permeate (desalted solution) from the modules outlets $A_1$, $A_2$, $A_3$, $A_4$, $A_5$, $A_6$.

Referring again to FIG. IA, the desalination apparatus further comprises a system for Feed Recharge (henceforth "FR"), whereby brine is replaced with fresh feed in the CC at the end of each desalination sequence of desired recovery. The FR system comprises the lines $E_2$, $B_1$, $B_2$, and C, the two-way valves $V_1$-$V_5$, the container CN, and the recharge pump RP. FIG. IA describes desalination in progress in the CC system, while recharge in progress takes place in the FR system. The CC and FR systems in FIG. IA are disengaged since valve $V_1$ is opened and valves $V_2$ and $V_3$ are closed. During the recharge operation of the FR system, fresh feed is admitted through valve $V_4$ (opened) and line $B_2$ to the top of the container CN, and at the same time brine is removed from the bottom of the container CN to the outside (arrow C) through line $B_1$, valve $V_5$ (opened) and line C, by means of the recharge pump RP which is actuated at low pressure (~1.0 bar) under nearly laminar flow conditions.

FIG. IB describes the valves positions after the container recharge operation completed and the FR system is being pressurized and made ready to provide fresh feed supply to the CC system. The valves of the FR system at this stage are closed, except for valve $V_3$ though which pressurization is taking place.

FIG. IC describes the valves positions when the FR system provides fresh feed supply to the CC system and removes the brine effluent. If the CC and FR systems are of the same intrinsic volume, one full FR container with fresh feed is sufficient to complete the recharge of the entire CC system. During the feed recharge operation, the desalination process is continued non-stop.

The direction of flow in the inventive apparatus is indicated by light grey arrows. Non-pressurized lines are indicated by dashed lines, lines which are pressurized part of the time are indicated by dotted lines and lines of the CC system which are continuously pressurized are indicated by continuous lines. It will be understood that the lines, valves and pumps shown in FIG. I(A-C) are but one way of implementing the invention and many other installations may be envisaged for diverse embodiments of the invention.

It will be understood that the inventive apparatus and method can be applied as non-modular or as modular systems, in the former case the pressurizing means comprises a variable pressure pump(s) for feed provided at atmospheric pressure, and in the latter case the pressurizing means comprises a variable pressure booster pump(s) for feed already provided under pressure. The non-modular inventive apparatus intended primarily for autonomous desalination units, whereas the modular apparatus intended as building blocks for large desalination plants wherein pressurized feed is supplied to the units centrally from a main line and the variable pressure booster pump of each unit in the system used for pressure adjustments as required by the unit.

The apparatus according to the invention may be realized using a large number of modules such that the modules are arranged in multiple parallel lines, each line supplied in parallel with solution for desalination from the main line of the apparatus and each module within each line also supplied in parallel. In such an apparatus separate circulation means may be used for each of the said lines respectively or a single circulation means may be used for all of the said lines.

The pressurizing means or the circulation means or both may be implemented by two or more pumps installed in parallel or any other design according to specific requirements.

In accordance with the inventive apparatus, the container need not be a vessel of large volume and it may be implemented as a pipe or duct section.

The desalination method of the invention involves the following steps, described herein below with reference to the apparatus of FIG. I(A-C): (I) the entire apparatus is filled with fresh sea water or brackish water supply; (II) the pressurizing pump(s) is set to deliver constant pressurized feed flow under the appropriate variable pressure conditions; (III) the circulation pump CP is actuated at low inlet-outlet pressure difference such that flow rate of concentrate to permeate is consistent with specifications of modules; (IV) the sequential RO desalination in the CC system is performed by the recycling of the process concentrate and its mixing with fresh pressurized feed supplied to the CC during the course of the desalination sequence; (V) concomitant with the completion of the desired sequential recovery in the CC system, flow circulation is diverted intermittently through the FR system until the CC system is recharged with a fresh feed supply and the brine effluent removed; (VI) concomitant with the completion of the fresh feed recharge of the CC system, the CC and FR systems are disengaged, the former starts a new desalination sequence and the latter undergoes fresh feed recharge combined with brine discharge followed by pressurization, thus, made ready the next CC recharge operation.

It will be understood that in order to maintain constant permeate flow from the modules of the inventive apparatus, the variable pressure in the CC system should account for a constant, or nearly constant, net driving pressure (henceforth "NDP"). It will be further understood that said NDP in the context of the inventive method is the pressure difference between the applied pressure, also referred to as counter pressure, and the osmotic pressure of the recycled solution at the inlet to modules during the continuous desalination process.

It will be obvious to those versed in the art that the desalination method of the invention may be operated in desalination apparatus of different designs as explained above in respect of the inventive apparatus as long as such an apparatus comprises a closed circuit of conducting lines with a container, one or more desalination modules of one or more membrane elements each supplied in parallel, a pressurizing means, a circulating means, a flow monitoring means and a conductance monitoring means.

Furthermore, it will be obvious to those versed in the art that single inventive apparatus of said modular design of any preferred production capacity can be joined together and made into a desalination plant of an expanded production capacity in which the pressurized feed is centrally generated and supplied to the individual units of the plant through extensions from a single high pressure delivery line of fresh feed.

EXAMPLE-I

The application of the new technology is exemplified in TABLE-I by sea water desalination under progressively increased pressure conditions of constant net driving pressure using an apparatus of the schematic design shown in FIG. I(A-C) with six modules of three elements each and a single container of 394 liter which is of the same intrinsic volume of the closed circuit. The elements in this example are of a commercial type, or similar, and their presumed specifications under test conditions are listed in TABLE-I. The specified maximum element recovery of 10% that of the head elements in the modules is not exceeded during the entire sequential, or consecutive sequential, desalination operation described by the example. The specified modules recovery of 24.5% cited in TABLE-I is that of a three-element module under test conditions with maximum element recovery being 10%. Permeate flow in the example under review is presumed constant since the desalination process is performed under constant, or nearly constant, net driving pressure (NDP) of ~30.4 bar which is the specified NDP under test the conditions of the elements. Under the conditions of constant NDP applied in the example, the pressurized feed flow per module (37.4 lit/min) and the recycled concentrate flow per module (115.3 lit/min) remain constant with the former being identical to the permeate flow per module (37.4 lit/min). The constant flow parameters for the exemplified apparatus of six modules is six time that cited in TABLE-I per single module.

The presumed efficiency factors (f) of pumps in this example are $f_{PP}$=0.88, $f_{CP}$=0.85 and $f_{RP}$=0.80; wherein, $f_{PP}$, $f_{CP}$ and $f_{RP}$ are the efficiency factors of the pressuring pump (PP), the circulation pump (CP) and the feed recharge pump (RP), respectively. In this example the presumed variable pressure delivery of the PP is in the range of 54.9-70.8 bar (mean pressure, 62.8 bar), RP operates at 0.5 bar and the CP operates at an inlet-outlet pressure difference($\Delta p$) of 1.0 Bar (~15 psi).

The example under review in TABLE-I contains constant flow data per module as expected of a system which operates under the cited variable applied pressure (AP) of constant net driving pressure (NDP). The constant flow is derived from the permeate flow equation (1) and the applied pressure requirements expressed by (2); wherein, $Q_p$ stand for permeate flow per element, A for permeability coefficient, S for membranes surface area, TCF for temperature correction factor, FF for fouling factor, NDP for net driving pressure, AP for applied pressure and OP for osmotic pressure. Recovery in the sequential desalination process under review is expressed by (3) and the sequential time period required to attain a desired recovery expressed by (4); wherein, Rec stands for percent recovery, V for the intrinsic volume of the closed circuit, v for the volume of the pressurized feed added to the system or the volume of permeate received, T for the sequential period for a specified recovery, Q for permeate flow per module and n for the number of modules per apparatus. Power data in the example under review obtained from the flow-pressure expression (5); wherein, P stands for power in kW, Q for flow in liter per minute, p for pressure, or pressure difference, in bar, and f for the efficiency coefficient of the power components.

The mean specific energy data in TABLE-I is derived from power data, the time elapsed (t) in the sequential period (T) for desired recovery and by accounting for the permeate volume released.

$$Q_p = A*S*(TCF)*(FF)*(NDP) \quad (1)$$

$$AP = (OP) + (NDP) \quad (2)$$

$$R_{ec}(\%) = 100*v/(V+v) \quad (3)$$

$$T = \{1/(n*Q)\}*\{(Rec*V)/(100-R_{ec})\} \quad (4)$$

$$P(kW) = (Q*p)/(592*f) \quad (5)$$

Other specific information disclosed in TABLE-I on the time coordinate (t, min.) of the sequential process includes; the module recovery (REC. 24.5%), the recovery build up (DESL. REC.) during the process; concentrate to permeate flow ratio (CONCEN. PERM. FLOW RATIO); the number of recycled closed circuits (Number RCC); modules inlet concentrations [CONC (%), t–0.25, inlet]; average concentrations of closed-circuit [CONC (%), t], power demand per module; the osmotic pressure (OP), applied pressure (AP) and net driving pressure (NDP) at modules inlets; and the mean Specific Energy (Mean S.E. kWh/m$^3$).

The combining of sequential desalination steps into a continuous process of consecutive sequences for continuous desalination is done by means of a controlled system which actuates valves and other components in compliance with on-line monitored information of concentrations and/or pressures and/or flow of permeate and/or of pressurized feed. The follow-up of the conductivity of the solution in the closed circuit is one of several means by which such a desalination process can be effectively managed and controlled.

According to the date in TABLE-I, the apparatus in this example operates with a sequential period (T) for 50% recovery of 107 seconds (1.75 minutes) of which some 34 seconds are consumed for closed circuit recharge with fresh feed through a container of 395 liters, the same volume as that of the closed circuit itself. Therefore, the time difference of 73 seconds (107-34) between successive actuations of the recharge container is the maximum period available for its recharge and pressurization.

In summary, the preferred embodiment of the inventive method and apparatus is exemplified (Example-I) by a units for 323 m$^3$/day capacity of desalted sea water on the basis of 100% availability and 50% recovery which requires a mean specific energy of 2.18 kWh/m$^3$ under variable counter pressure (54.9-70.8 bar) conditions or 2.38 kWwh/m$^3$ under constant applied pressure (70.8 bar) conditions.

TABLE II

The performance of the non-modular desalination unit in Example-1 as compared with a plant comprised of ten such modular units.

| Items Compared | M1E3 | 6[M1E3] | 10{6[M1E3]} |
|---|---|---|---|
| Daily permeate production (m3/day) | 53.9 | 323.3 | 3,233 |
| Daily pressurize feed supply (m3/day) | 53.9 | 323.3 | 3,233 |
| Daily non-pressurized feed supply (m3/day) | 53.9 | 323.3 | 3,233 |
| Daily brine removed (m3/day) | 53.9 | 323.3 | 3,233 |
| Maximum element recovery (%) | 10 | 10 | 10 |
| Module recovery (%) | 24.5 | 24.5 | 24.5 |
| Minimum sequential pressure (bar) | 54.9 | 54.9 | 54.9 |
| Maximum sequential pressure (bar) | 70.8 | 70.8 | 70.8 |
| Average sequential pressure (bar) | 62.8 | 62.8 | 62.8 |
| Minimum power demand (kW) | 4.17 | 25.0 | 250 |
| Maximum power demand (kW) | 5.77 | 34.6 | 346 |
| Average power demand (kW) | 4.97 | 29.8 | 298 |
| Sequence duration (seconds) | 107 | 107 | 107 |
| Recovery (%) | 50 | 50 | 50 |
| Mean Specific Energy (kWh/m3) | 2.18 | 2.18 | 2.18 |
| Footprint estimated (m2) | 6 | 6 | 60 |

M1E3: The three elements module used in Example-I as well as here.
6[M1E3]: The six modules non-modular desalination unit in Example-I.
10{6[M1E3]}: The joining of 10 modular units of the type in Example-I.

EXAMPLE-II

The connecting of 10 desalination units of modular design analogous to that in Example-I to a central pressurized feed supply line, with each unit equipped with a variable pressure booster instead of a variable pressure pump, exemplifies the modular apparatus application of the novel inventive method. Some performance data of three elements desalination modules, a modular unit with an analogous design to that in Example-I with 6 modules of 18 elements, and a desalination plant containing ten such modular units are exemplified in TABLE-II

TABLE I

Example of continuous desalination of sea water (3.5%) with 50% recovery by consecutive sequences of 1.75 minute each carried out in an apparatus of the design described in FIG.IA-C with six modules, three elements each, under variable applied pressure conditions of constant net driving pressure of 30.4 bar.

| Elements Specifications under TC | | | |
|---|---|---|---|
| Daily element output | 22 m3/day | Number of modules | 6 unit |
| Maximum element recovery | 10% | Number of elements | 18 unit |
| Net driving pressure (NDP) | 30.4 bar | Constant NDP of operation | 30.4 bar |
| Inlet feed flow | 153 lit/min | Recovery per module | 24.5% |
| Permeate flow | 15.3 lit/min | Feed concentration | 3.5% |
| Temperature | 25° C. | Closed-circuit volume | 394 liter |
| | | Recharge container volume | 394 liter |
| Actual Performance Data of Apparatus | | Recovery of entire process | 50% |
| | | Sequence duration (50%) | 1.75 min |
| Average Element flow | 18.0 lit/min | Closed-circuit recharge time | 34 sec |
| Daily permeate production | 323 m3/day | Efficiency, pressurizing PP | 88% |
| Minimum applied pressure | 54.9 bar | Efficiency, circulation CP | 85% |
| Maximum applied pressure | 70.8 bar | Efficiency, recharge RP | 80% |
| Minimum power per module | 4.17 kW | Pressure difference of CP | 1.0 bar |
| Maximum power per module | 5.31 kW | Pressure of RP | 0.5 bar |

GENERAL PARAMETERS PER MODULE

| Time | CF | DESALTED-PERMEATE | | DESAL | CONC PERM | | CONC (%) | | Power | Module Inlet Pressure (bar) | | | mean S.E. |
|---|---|---|---|---|---|---|---|---|---|---|---|---|---|
| t | flow | REC | flow | VOL | REC | FLOW Number | t-0.25 | t | | OP | AP | NDP | |
| min | lit/min | % | lit/min | liter | % | RATIO RCC | inlet | CC | kW | | | | kWh/m3 |
| 0.25 | 153 | 24.5 | 37.4 | 9.4 | 12.5 | 3.1 | 0.44 | 3.50 | 4.00 | 4.17 | 24.6 | 54.9 | 30.4 | 1.98 |
| 0.50 | 153 | 24.5 | 37.4 | 18.7 | 22.2 | 3.1 | 0.88 | 3.88 | 4.50 | 4.36 | 27.1 | 57.5 | 30.4 | 1.99 |
| 0,75 | 153 | 24.5 | 37.4 | 28.1 | 30.0 | 3.1 | 1.32 | 4.26 | 5.00 | 4.55 | 29.8 | 60.2 | 30.4 | 2.03 |
| 1.00 | 153 | 24.5 | 37.4 | 37.4 | 36.4 | 3.1 | 1.76 | 4.63 | 5.50 | 4.74 | 32.4 | 62.8 | 30.4 | 2.06 |
| 1.25 | 153 | 24.5 | 37.4 | 46.8 | 41.7 | 3.1 | 2.25 | 5.01 | 6.00 | 4.93 | 35.1 | 65.5 | 30.4 | 2.10 |
| 1.50 | 153 | 24.5 | 37.4 | 56.1 | 46.2 | 3.1 | 2.64 | 5.39 | 6.50 | 5.12 | 37.3 | 68.1 | 30.4 | 2.14 |
| 1.75 | 153 | 24.5 | 37.4 | 55.5 | 50.0 | 3.1 | 3.08 | 5.77 | 7.00 | 5.31 | 40.4 | 70.8 | 30.4 | 2.18 |

Abbreviations
TC, Test Conditions
NDP, Net Driving Pressure
PP, Pressurizing Pump
CP, Circulation Pump
RP, Recharge Pump
CF, Circulated Feed
REC, Recovery
CONC, Concentration
Desal, Desalination
PERM, Permeate
RCC, Recycled Closed Circuit
AP, Applied Pressure
CC, Closed Circuit
OP, Osmotic Pressure
VOL, Volume

The invention claimed is:

1. An apparatus for continuous consecutive sequential desalination of a salt water solution by reverse osmosis that comprises:
   at least one closed circuit comprising at least one desalination module, each said at least one desalination module comprising an inlet and an outlet, wherein each said at least one desalination module can be connected in parallel with another said desalination module by conducting conducing lines, each of said at least one desalination module comprising at least one membrane element;
   at least one pressurizing means for creating sufficient counter pressure to enable reverse osmosis desalination and replacement of released permeate by fresh feed in said closed circuit;
   at least one circulation means for recycling of desalinated solution through said at least one desalination module of said closed circuit;
   at least one conducting line means for permeate collection from said at least one desalination module of said closed circuit;
   a single container means to enable replacement of brine by fresh feed in said closed circuit while desalination is continued;
   at least one line for conducting desalinated solution from said closed circuit to said single container;
   at least one line for conducting fresh feed solution to be desalinated from said single container to said closed circuit;
   at least one line for recharging said single container with fresh feed solution to be desalinated;
   at least one line for removing brine effluent from said single container;
   at least one valve means to enable the engagement and disengagement of said single container from said closed circuit, the replacement of brine by fresh feed from said single container, and the compression and decompression of said single container; and
   control means to enable continuous closed circuit desalination of desired recovery to proceed in consecutive sequential steps under variable pressure, or constant pressure conditions.

2. An apparatus for closed-circuit desalination of a salt water solution by reverse osmosis according to claim 1, wherein when variable pressure is applied controllably during closed-circuit desalination sequences using said apparatus the difference between applied pressure and osmotic pressure at each stage during the closed-circuit desalination process is maintained constant or substantially constant.

3. An apparatus for closed-circuit desalination of a salt water solution by reverse osmosis according to claim 1, wherein when constant pressure is applied during closed circuit desalination sequences the difference between applied pressure and maximum osmotic pressure during the desalination process is maintained above a minimum predefined level.

4. An apparatus for closed-circuit desalination of a salt water solution by reverse osmosis according to claim 1, wherein said control means comprising means for monitoring the progress of desalination or is a means for monitoring the flow of fresh salt water feed into said closed-circuit and/or the flow of the desalted solution from said closed-circuit.

5. An apparatus for closed circuit desalination of a salt water solution by reverse osmosis according to claim 1, wherein said control means comprising means for monitoring the progress of desalination is a concentration monitoring means.

6. An apparatus for closed circuit desalination of a salt water solution by reverse osmosis according to claim 1, wherein said at least one module comprises at least one semi-permeable membrane elements within a housing.

7. An apparatus for closed circuit desalination of a salt water solution by reverse osmosis according to claim 1, wherein when there are more than one of said at least one module said modules are grouped in parallel batteries, each of said parallel batteries comprising a plurality of modules.

8. An apparatus for closed circuit desalination of a salt water solution by reverse osmosis according to claim 1, wherein said single container means comprises cylindrical conduit sections.

9. An apparatus for closed-circuit desalination of a salt water solution by reverse osmosis according to claim 1, wherein said pressurizing means comprises at least one pressurizing pump, that can be actuated in parallel or in line.

10. An apparatus for closed circuit desalination of a salt water solution by reverse osmosis according to claim 1, wherein said circulation means comprises at least one circulation pump that can be actuated in parallel or in line.

11. An apparatus according to claim 1 for closed circuit desalination of a salt water solution by reverse osmosis wherein the solution can comprise sea water.

12. An apparatus according to claim 1 for closed circuit desalination of a salt water solution by reverse osmosis wherein the solution can comprise brackish water.

13. An apparatus according to claim 1 for closed circuit desalination of a salt water solution by reverse osmosis wherein the solution can comprise treated domestic effluent.

14. An apparatus according to claim 1 for closed circuit desalination of a salt water solution by reverse osmosis wherein the solution can comprise an industrial effluent.

15. A method for consecutive sequential closed circuit desalination of a salt water solution by reverse osmosis using an apparatus comprising a closed circuit with at least one desalination module, wherein when there are more than one desalination module the desalination modules are connected in parallel to the circuit, the apparatus further comprising a single container means to enable replacement of brine by fresh feed in the closed circuit while desalination is continued; a line means for connecting the at least one module and the single container means, a pressurizing means, a circulating means, a means for monitoring the progress of the desalination process and a plurality of valve means; said method consisting of consecutive desalination sequences to enable continuous desalination of a salt water solution non stop by the following steps:
   a) filling the closed circuit and single container with fresh salt water solution under atmospheric pressure, sealing the closed circuit and single container and pressurizing the fresh salt water solution within the closed circuit and single container;
   b) recycling the pressurized salt water solution through the closed circuit desalination modules at a predefined flow rate by means of the circulation means such that permeate is released efficiently from the at least one module;
   c) controlling the duration of the desalination sequence and the pressure applied during said desalination sequence according to the progress of desalination recovery as manifested by the monitoring means;
   d) collecting the desalinated solution from the at least one module;

e) engaging the single container filled with fresh feed and pressurized with the closed circuit at the desired recovery level to enable the recharge of the closed circuit with fresh feed at the end of each said desalination sequence and without stopping said desalination process;

f) disengaging the single container from the closed circuit after the closed circuit is recharged with fresh salt water feed to be desalinated, and g) decompressing the disengaged single container filled with brine effluent, replacing the brine effluent in the single container with fresh salt water solution feed at substantially atmospheric pressure, sealing the single container after the single container is substantially recharged with fresh feed and the compression of the single container is in readiness for the next engagement with the closed circuit.

16. A method for sequential closed circuit desalination of a salt water solution by reverse osmosis according to claim 15 wherein the applied pressure output of the pressurizing means is gradually increased during said desalination sequence as a function of the increase of desalination recovery monitored by the monitoring means, such that the ratio of applied pressure to osmotic pressure is maintained above a predetermined minimum value throughout said desalination sequence.

17. A method for sequential closed circuit desalination of a salt water solution by reverse osmosis according to claim 15 wherein constant counter pressure is applied throughout said desalination sequence such that constant counter pressure is maintained at a predetermined minimum ratio above the osmotic pressure of the effluent solution discharged at the end of each desalination sequence.

18. A method for sequential closed circuit desalination of a salt water solution by reverse osmosis according to claim 15, wherein the monitoring means is a flow meter means that monitors the volume of the desalted water or the volume of the fresh salt water solution feed that is pressurized into the closed circuit system.

19. A method for sequential closed circuit desalination of a salt water solution by reverse osmosis according to claim 15, wherein the monitoring means is a concentration monitoring means.

20. A method for consecutive sequential closed circuit desalination of a salt water solution by reverse osmosis in a closed circuit comprising at least one desalination module wherein when there are more than one desalination module the desalination modules are connected in parallel to the circuit, the method comprising the steps of: engaging a single container filled with fresh feed and pressurized with the closed circuit at the desired recovery level to enable the recharge of the closed circuit with fresh feed at the end of each said desalination sequence and without stopping said desalination process; disengaging the single container from the closed circuit after the closed circuit is recharged with fresh salt water feed to be desalinated, and decompressing said disengaged single container filled with brine effluent, replacing the brine effluent in the single container with fresh salt water solution feed at substantially atmospheric pressure, sealing the single container after the single container is substantially recharged with fresh feed so that completed, and the compression of the single container is in readiness for the next engagement with the closed circuit.

* * * * *